April 26, 1932. V. V. SAKS 1,855,990
APPARATUS FOR THE TREATMENT OF FEED WATER
Filed Sept. 12, 1931 3 Sheets-Sheet 1

Inventor
V. V. Saks:
by
W. E. Evans
Attorney.

April 26, 1932.   V. V. SAKS   1,855,990
APPARATUS FOR THE TREATMENT OF FEED WATER
Filed Sept. 12, 1931   3 Sheets-Sheet 3
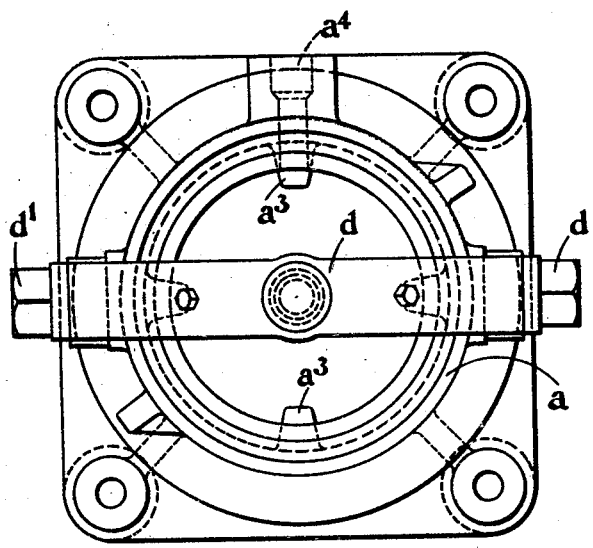
Fig. 3.
Fig. 4.
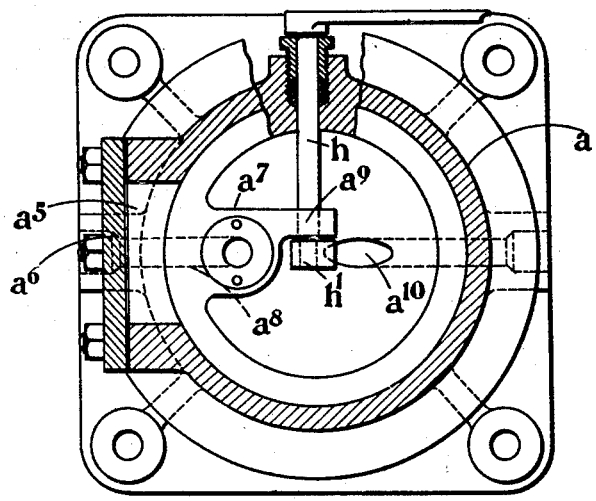
Inventor
V. V. Saks:
by
W. E. Evans
Attorney.

Patented Apr. 26, 1932

1,855,990

UNITED STATES PATENT OFFICE

VADIM VLADIMIROVITCH SAKS, OF LONDON, ENGLAND, ASSIGNOR TO FILTRATORS LIMITED, OF LONDON, ENGLAND

APPARATUS FOR THE TREATMENT OF FEED WATER

Application filed September 12, 1931, Serial No. 562,519, and in Great Britain March 28, 1930.

This invention relates to the treatment of hard water for the avoidance or prevention of the formation of scale, for example, in connection with boiler feed water and generally with respect to vessels in which scale may be formed.

The invention is of special application to apparatus used for the production of an extract from vegetable seeds such as linseed, or otherwise, in the use of steam, and for the delivery of the extract to steam generators or other vessels or water systems for the avoidance of incrustation or scale.

The invention is of special application in apparatus such as those of the prior British Patents Nos. 176294 and 268665.

In such apparatus the treatment of the vegetable seed such as linseed or other substance used is effected by the admission of steam from the boiler into the vessel containing the substance, and by the delivery of the extract through a steam trap whence it passes for admixture with the water into the feed water tank or directly into the generator, or into the water system or vessel to which the invention is applied, or elsewhere.

The invention has among its objects to simplify the apparatus used by causing the automatic discharge of the extract from the extracting vessel itself in which the extract is produced.

According to the invention the lower part of the extracting vessel is adapted for use as a stem trap, and for the accommodation of a float-operated or other automatic discharge valve by which on the accumulation of the liquid extract in the lower part of the extracting vessel to a determined level, the valve causes the opening of an outlet through which the accumulated liquid extract passes out, whereupon the outlet may be closed.

A construction of the apparatus according to the invention is illustrated, by way of example, in the accompanying drawings.

Figure 3 is a plan view of the apparatus, the cover and container being removed, and for the sake of clearness the details of the steam trap mechanism are not shown.

Figure 4 is a cross-sectional view of the apparatus taken on the line 4—4 of Figure 1, the details of the steam trap mechanism for the sake of clearness not being shown.

Figure 1:
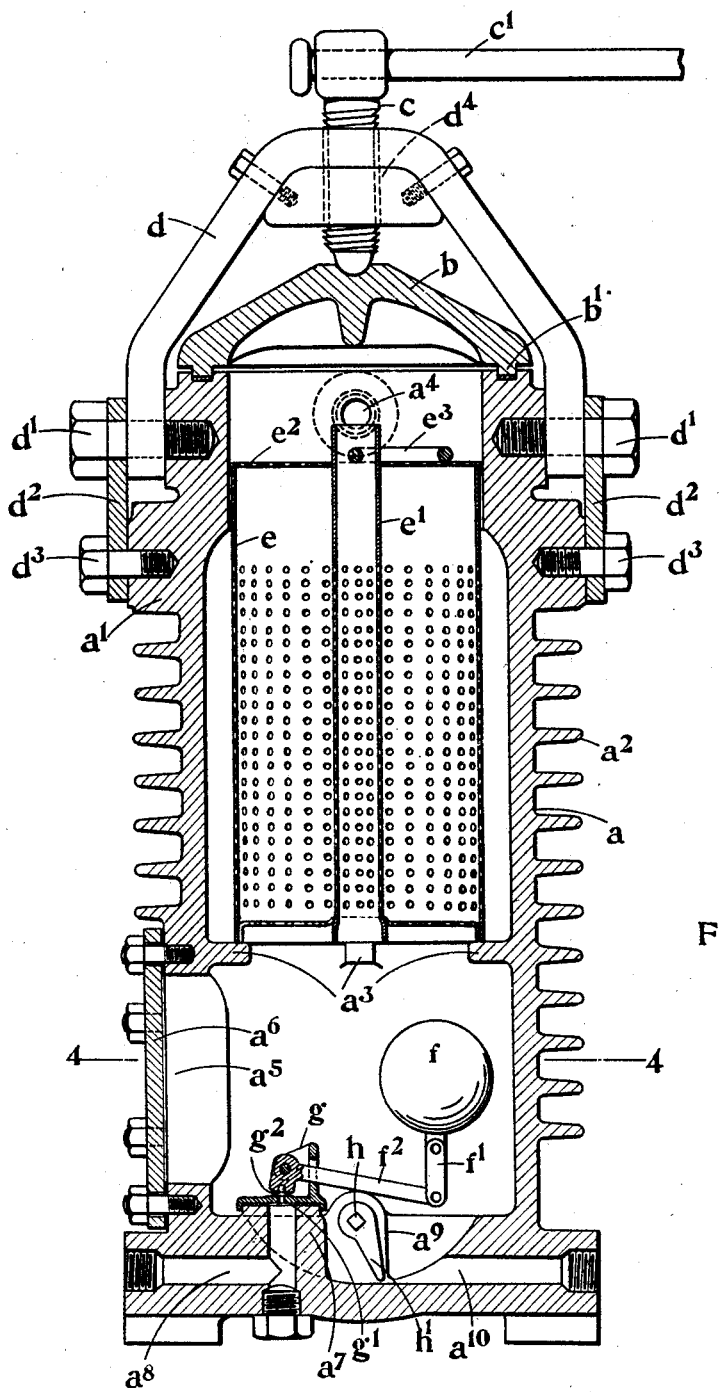
Figure 1 is a sectional elevation of the apparatus.
Figure 2:
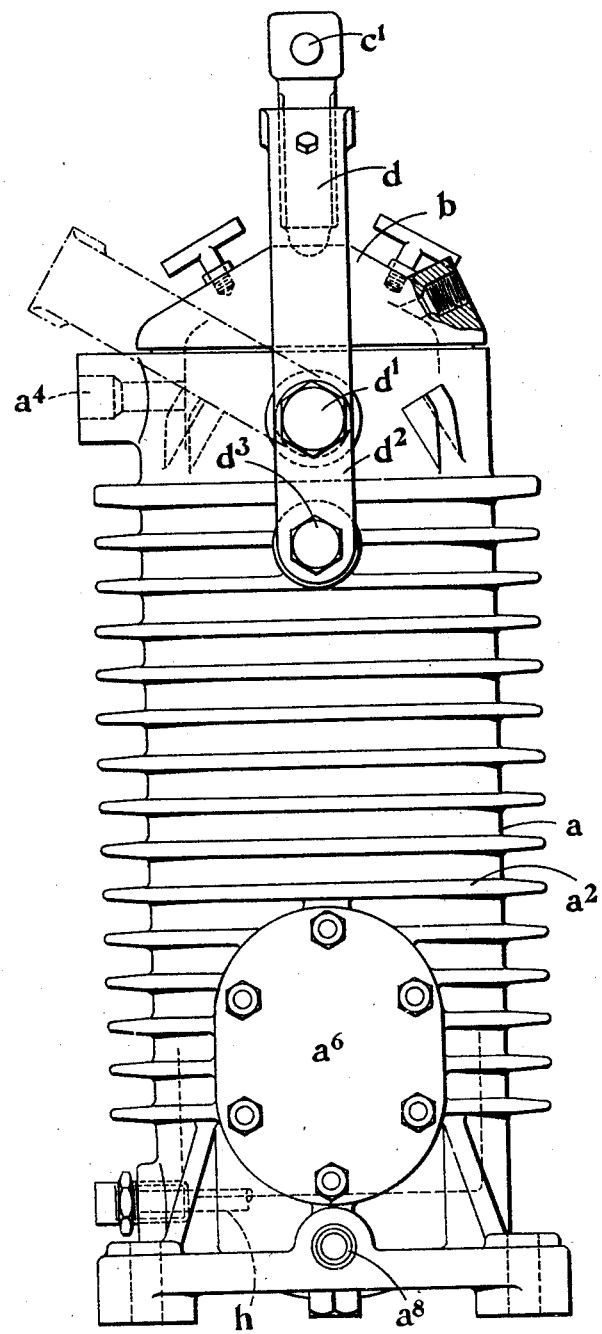
Figure 2 is an elevation of the apparatus taken at right angles to Figure 1.

In carrying the invention into effect according to the construction represented in the accompanying drawings, in the production of an extracting vessel such as described, the casing $a$ conveniently takes a cylindrical form, and has at its upper end a cover plate $b$ which makes a tight joint with the casing, as for example by means of a rib or flange $b^1$ of a rectangular cross-section on the underface adapted to enter a groove of corresponding form in the top face of the casing, in which groove packing or a packing ring may be laid. The cover plate $b$ takes a substantially conical or other form, and is adapted centrally or in other position for the reception of the lower part of a clamping screw $c$, by which the cover plate may be maintained in its closed position with a steam-tight joint. The clamping screw $c$ for the purpose is conveniently carried in a central position upon a strap $d$ of a substantially U or V shape, the lower ends of which are pivotally secured by means of screws $d^1$ in diametrically opposite positions at the upper end of the casing. The screws $d^1$ are advantageously assisted to withstand the bending force exerted by the strap by means of links $d^2$ which are secured at their lower ends by means of screws $d^3$ screwing into bosses $a^1$ provided upon the casing $a$. The strap $d$, in a middle position, may conveniently be provided with a reinforcing block $d^4$, through which the clamping screw $c$ also passes, and the clamping screw at its outer end is provided with a handle $c^1$ that is adapted to slide through a transverse hole in the head of the clamping screw, so that the handle may be removable or extended out for effective use in imposing the necessary pressure upon the cover plate to ensure its tight closure.

The casing $a$ is provided for the main part of its length with parallel and external integral ribs or fins $a^2$, such as are commonly employed on the cylinders of air cooled internal combustion engines, to facilitate the outward radiation of heat from the casing, and to facilitate condensation within the casing. It will, however, be understood that a water cooling jacket may instead be employed. The casing, moreover, in the main part of its length is provided of an internal diameter slightly larger than at the upper end of the casing whereby an annular space is provided to surround the container $e$ for the linseed or other substance to be extracted. This container is advantageously provided of a diameter corresponding to the internal diameter of the casing at its upper end, and the peripheral wall of the container is provided with holes advantageously over the whole of its lower part. The container is also provided with an inner perforated concentric tube $e^1$ of small diameter extending from the top to the bottom and also advantageously provided with holes over the whole of its lower part. At or about a position a little lower than the middle of the length of the casing inwardly extending projecting parts $a^3$, or interrupted flanges are provided upon which the container may be supported, and the container may be adapted for the reception of a cover plate $e^2$, having in the central position an aperture to accommodate the upwardly protruding inner concentric tube $e^1$ which is open at both ends. The diameter of the container $e$ thus corresponds to the internal diameter of the casing at its upper end and the length of the container is so determined in relation to that part of the casing provided for its reception, that a space is left at the upper part above the container into which steam is admitted through a lateral inlet $a^4$, so that thus the steam is readily accessible to the inner concentric tube $e^1$ through its upper open end, and may thus pass through the body of linseed or other substance within the container. The extract may thus pass through the holes or perforations in the peripheral wall of the container and may descend to collect in the lower part of the casing.

The upper protruding end of the inner concentric tube may be adapted for the reception of a pivoted metal loop $e^3$ or the like by which the container may be raised from and lowered into its position within the casing.

The lower part of the casing beneath that at which the container $e$ is adapted to be set in the manner described is provided as a space in which the liquid extract may accumulate, and from which it may be permitted to pass out on its way to the feed tank or elsewhere by automatically operating means. For this purpose at the lower end of the peripheral wall of the casing $a$ an aperture $a^5$ is suitably provided with a surrounding faced flange for the reception of a cover plate $a^6$, through which aperture a float-valve mechanism of the kind usually provided in steam traps may be introduced, and mounted within the lower part of the casing and through which it is accessible for inspection, renewal or repair.

The float-valve operating mechanism of the trap provided in the lower part of the casing may be of any suitable construction. As illustrated the float $f$ is, by means of a pair of links $f^1$, connected to a lever $f^2$ the short arm of which may be integrally formed with the longer arm and may be disposed substantially at right angles to extend downwardly therefrom, the lever $f^2$ being mounted to pivot at the end of the longer arm at which the short arm is connected. It is pivoted upon an integral bracket or fitting $g$, the base part of which is provided with an outlet hole $g^1$ and a prepared face on which a sliding valve $g^2$ may move, the upper part of which is formed as a ball to engage in a suitable cavity in the lower part of the short arm of the lever $f^2$, the bracket or fitting being suitably secured upon a boss $a^7$ formed in the lower part of the casing and over the outlet passage $a^8$ which branches out laterally.

In a substantially central position in the cavity formed in the lower part of the casing a lateral extension $a^9$ of the boss $a^7$ serves as a bearing bracket for a spindle $h$ extending outwardly through a gland and stuffing box in the wall of the casing, for external operation and carrying at its inner end an arm $h^1$ adapted to raise the longer arm of the lever $f^2$ to open the valve $g^2$ for discharging the liquid contents at will into the feed tank or elsewhere. In an opposite position to the outlet before referred to an outlet passage $a^{10}$ may be provided for the reception of a drain cock.

I claim:

In an apparatus for producing a scale or incrustation preventing or removing fluid extract from suitable material, for supply to the water in steam boilers and the like, by the action of steam and its water of condensation on such material, a casing formed to provide an upper extracting chamber and a lower extract receiving chamber, the said upper chamber having at its upper end a steam supply inlet and being in communication at its lower end with the upper end of the lower chamber, and said lower chamber having at its lower end an extract discharge outlet, an extracting vessel in the upper chamber comprising a perforate container for the material to be treated, said container being in communication with the steam inlet and provided with means for causing the flow of the steam and water of condensation therefrom throughout the material, supporting means on which the container rests projecting inwardly from the walls of the casing at the point of juncture of said chambers, whereby the extract as formed will pass from the perforate container to the extract receiving chamber, a float valve in the extract receiving chamber embodying a lever connected to a valve and to a float, a device for manually operating the valve from the outside of the casing comprising a rock shaft projecting exteriorly and interiorly of the casing, and an arm carried by said shaft for engagement with the lever to open the valve.

VADIM VLADIMIROVITCH SAKS.